United States Patent
Cunha et al.

(10) Patent No.: US 6,434,966 B1
(45) Date of Patent: Aug. 20, 2002

(54) SELF-CONTAINED LIQUID STORAGE, DELIVERY, AND AUTOMATIC FILL APPARATUS AND METHOD

(75) Inventors: James P. Cunha, Westford, MA (US); Dennis J. Cohlmia, Wichita, KS (US); James A. Steinbacher; Joel D. Hockenbury, both of Arkansas City, KS (US)

(73) Assignee: Kan-Pak, L.L.C., Arkansas City, KS (US)

( * ) Notice: Subject to any disclaimer, the term of this patent is extended or adjusted under 35 U.S.C. 154(b) by 0 days.

(21) Appl. No.: 09/814,081

(22) Filed: Mar. 21, 2001

Related U.S. Application Data

(63) Continuation-in-part of application No. 09/650,586, filed on Aug. 30, 2000.
(60) Provisional application No. 60/156,976, filed on Oct. 1, 1999.

(51) Int. Cl.[7] .................................................. B67D 5/62
(52) U.S. Cl. .................... 62/389; 222/129.1; 222/146.6
(58) Field of Search .......................... 62/338, 389, 298; 222/105, 129.1, 146.6

(56) References Cited

U.S. PATENT DOCUMENTS

| | | | | |
|---|---|---|---|---|
| 3,208,641 A | * | 9/1965 | Brugioni | 62/338 |
| 3,528,587 A | | 9/1970 | Popinski | 222/56 |
| 3,638,392 A | | 2/1972 | Welker, Jr. et al. | 53/123 |
| 3,656,316 A | | 4/1972 | Stock | 62/306 |
| 3,828,572 A | | 8/1974 | Calim | 62/340 |
| 3,934,427 A | | 1/1976 | Keyes | 62/342 |
| 4,201,558 A | | 5/1980 | Schwitters et al. | 62/70 |
| 4,487,337 A | | 12/1984 | DeJardins | 222/129.3 |
| 4,528,824 A | | 7/1985 | Herbert | 62/331 |
| 4,538,427 A | | 9/1985 | Cavalli | 62/342 |
| 4,544,084 A | | 10/1985 | Cleland | 222/56 |
| 4,625,525 A | | 12/1986 | Bradbury et al. | 62/330 |
| 4,728,005 A | | 3/1988 | Jacobs et al. | 222/64 |
| 4,869,072 A | | 9/1989 | Sexton et al. | 62/136 |
| 5,000,352 A | | 3/1991 | Cleland | 222/129.2 |
| 5,348,753 A | | 9/1994 | Abnell et al. | 426/231 |
| 5,419,150 A | | 5/1995 | Kaiser et al. | 62/342 |
| 5,487,493 A | | 1/1996 | McNabb | 222/153.14 |
| 5,542,265 A | * | 8/1996 | Rutland | 62/338 |
| 5,575,405 A | * | 11/1996 | Stratton et al. | 222/129.1 |
| 5,588,558 A | | 12/1996 | Cox et al. | 222/64 |
| 5,771,917 A | | 6/1998 | Carney et al. | 137/238 |
| 5,813,574 A | | 9/1998 | McNabb | 222/146.6 |
| 5,950,448 A | | 9/1999 | Barnes et al. | 62/390 |
| 5,967,226 A | | 10/1999 | Choi | 165/63 |

FOREIGN PATENT DOCUMENTS

| | | | | |
|---|---|---|---|---|
| GB | 2154204 | 9/1985 | | B67D/5/64 |
| GB | 2287306 | 9/1995 | | F25C/1/00 |

* cited by examiner

*Primary Examiner*—William E. Tapolcai
(74) *Attorney, Agent, or Firm*—Head, Johnson, Kachigian

(57) ABSTRACT

A self-contained liquid storage, delivery, and automatic fill apparatus and method for a semi-frozen or chilled liquid beverage machine having a bowl to contain semi-frozen beverage. The apparatus includes a housing having at least one refrigerated storage cavity in the housing for receiving a bulk storage container of liquid beverage. The housing includes a planar surface, the planar surface adapted to support the beverage machine thereon. A fluid conduit is provided for passing the beverage from the bulk storage container to the beverage machine.

12 Claims, 4 Drawing Sheets

SELF-CONTAINED LIQUID STORAGE, DELIVERY, AND AUTOMATIC FILL APPARATUS AND METHOD

CROSS-REFERENCE OF RELATED APPLICATION

This application is a continuation-in-part of U.S. patent application Ser. No. 09/650,586 filed Aug. 30, 2000 which claims priority to U.S. Provisional Patent Application No. 60/156,976 filed Oct. 1, 1999, entitled SELF-CONTAINED LIQUID STORAGE, DELIVERY, AND AUTOMATIC FILL APPARATUS and is hereby incorporated by reference.

BACKGROUND OF THE INVENTION

1. Field of the Invention.

The present invention relates to the storage of bulk package aseptic beverage containers and to the automatic filling of semi-frozen or chilled liquid beverage dispensers. In particular, the present invention is directed to a self-contained apparatus and process for the refrigerated storage of bulk package aseptic beverage containers, delivery of liquid from the bulk package containers, and automatic filling of semi-frozen or chilled liquid beverage dispensers.

2. Prior Art.

Different types of semi-frozen and chilled liquid beverage dispensers are known. Often, these dispensers have a clear plastic container or bowl and produce the semi-frozen product from a liquid. These dispensers then store the product in a semi-frozen condition for dispensing. When the semi-frozen beverage is depleted, the bowl must be refilled. The top of the bowl is removed and liquid is replenished by an attendant. After the beverage dispenser has been refilled with liquid, a time period is required to reach the semi-frozen state. The beverage dispensers may be used for chilled beverages, frozen beverages such as lemonade, alcoholic drinks such as piña coladas or margaritas, or semi-frozen beverages sometimes known as slushies.

The beverage device itself typically includes a cylinder within the bowl which is refrigerated with refrigerant. A helical blade continually moves across the external portion of the cylinder to scrape off frozen crystals formed by the refrigeration process. Accordingly, over time, the entire contents of the bowl becomes semi-frozen and the product is mixed while in the bowl.

As the product is dispensed, the level in the bowl is lowered. A film of the product may remain on the walls of the bowl above the then current level of the chilled or semi-frozen product. The film on the bowl is not in contact with the chilled or frozen zone, has a tendency to rise to ambient temperature and requires periodic cleaning. When it is desired to clean the dispenser, a cover on the bowl may be lifted off and then slid forward. Once the contents of the bowl have been removed, the bowl can be pulled forward to the front and removed for washing and cleaning. To refill, the liquid mixture must be poured from a bulk storage container into the open top by an attendant. The process to replenish and the process to clean are both time consuming.

The liquid may be packaged for storage and transportation in various ways such as in plastic containers or other packaging.

Bulk packaging for beverage products has existed for a considerable time period. One type of bulk package is known as a "bag'n box". A flexible inner storage membrane, such as a plastic, is retained within a rigid package such as a cardboard or corrugated box. The product packaged in this format is typically shelf stable and capable of being pumped to a dispenser from a remote location. There are a plurality of systems to accomplish this result and usually include a rack for multiple bag'n box storage devices at a remote location, at ambient temperature, utilizing pumps to move the product from the remote station to the dispenser. Existing delivery systems, however, are designed to deliver only high acid products. Such delivery systems are not filly refrigerated. The present invention is designed to deliver both high acid products and low acid aseptic products which are subject to special regulations by the FDA. Furthermore, the delivery system is fully refrigerated.

One type of beverage is packaged and transported in aseptic conditions. The aseptic process allows beverages to be formulated without preservatives which produces a superior quality beverage compared to conventional methods. Aseptic products are shelf stable until they are opened and at that time, they need to be consumed or refrigerated.

In recent years, bulk packaging systems have been developed for aseptic liquid products. The aseptic package functions only as a package device for transportation and does not function as a delivery system for the product.

It is also well known that the shelf space in convenience stores and restaurants is extremely valuable and its use must be maximized. Accordingly, making use of existing shelf space is desirable.

There remains a need to retrofit a liquid storage, delivery and automatic filling device to a semi-frozen liquid beverage dispenser.

There is also a need to increase production capacity of a semi-frozen liquid beverage dispenser beyond the capacity of the particular bowl and automatically fill the bowl from bulk storage.

There is also a need to decrease the downtime of a semi-frozen liquid beverage dispenser device because of required replenishing of liquid by automatically refilling the liquid dispenser device.

There is also a need to decrease the downtime of a semi-frozen liquid beverage dispenser device because of required periodic cleaning.

There is also a need to maintain the semi-frozen liquid beverage dispenser in a nearly filled condition.

There is a further need to maintain the level of beverage product in a semi-frozen liquid beverage device to maintain consistency of the beverage delivered.

There is a further need to provide a self-contained apparatus that will be accessible to attendant personnel yet take up very little shelf space.

There is a further need to provide a self-contained liquid storage, delivery, and automatic fill apparatus that will retain liquid in refrigerated condition at all times from the bulk storage package through delivery and into a chilled or semi-frozen liquid beverage device.

There is a further need to provide a self-contained liquid storage, delivery, and automatic fill process that will promote hygiene in the refilling and cleaning process and will decrease handling of bulk storage containers.

SUMMARY OF THE INVENTION

The present invention provides a self-contained liquid storage, delivery and automatic fill apparatus which will be used with a chilled or semi-frozen liquid beverage machine. In a preferred embodiment, the apparatus will include a storage cavity located in a housing.

The present invention provides a retrofitable base unit which is used in combination with a liquid beverage dispenser. The base unit will rest on an existing shelf and be located beneath the dispenser so that the invention will make use of existing shelf space. The unit includes a main housing having at least one refrigerated storage cavity for receiving a bulk storage membrane container.

The housing also includes a drawer accessible from the front of the housing for locating the bulk storage membrane container. The drawer is preferably located on guide tracks for easy access to the cavity.

The cavity is refrigerated to retain the liquid product in refrigerated condition. The refrigeration system may include a compressor, an evaporator, a fan, condenser coils and a thermostat. The bulk storage container holds liquid product in a flexible membrane bag with an insertion point for selectively attaching a supply hose first end. The supply hose second end attaches to and is in fluid communication with a pump assembly which selectively or automatically moves liquid product to a beverage dispenser hopper. The feed tube first end is in fluid communication with a product pump assembly and moves the product through a feed tube by a communication mechanism tower assembly.

A water supply includes a water supply inlet, water coils which permit water to pass therethrough and be chilled in the refrigerated cavity, and a water pump assembly. Chilled water is transported through the feed tube via the tower assembly. The tower assembly provides chilled water and refrigerated product to the hopper. The tower assembly includes an upright housing which preferably extends along the side of the dispenser machine. The tower cap is positioned over the hopper such that the nozzle is in communication with the bowl.

An operation control panel interface includes a main power activation switch. The panel interface also includes a chilled water pump assembly and product mix pump assembly activation mechanism.

A sensor may be provided on the chilled water pump assembly and product pump assembly to sense when and how much respective chilled water and product have been delivered to the hopper.

The present invention provides a totally refrigerated environment for the liquid product from the plastic membrane bulk storage containers through the delivery system and into the beverage dispenser.

DETAILED DESCRIPTION OF THE PREFERRED EMBODIMENTS

Figure 1:
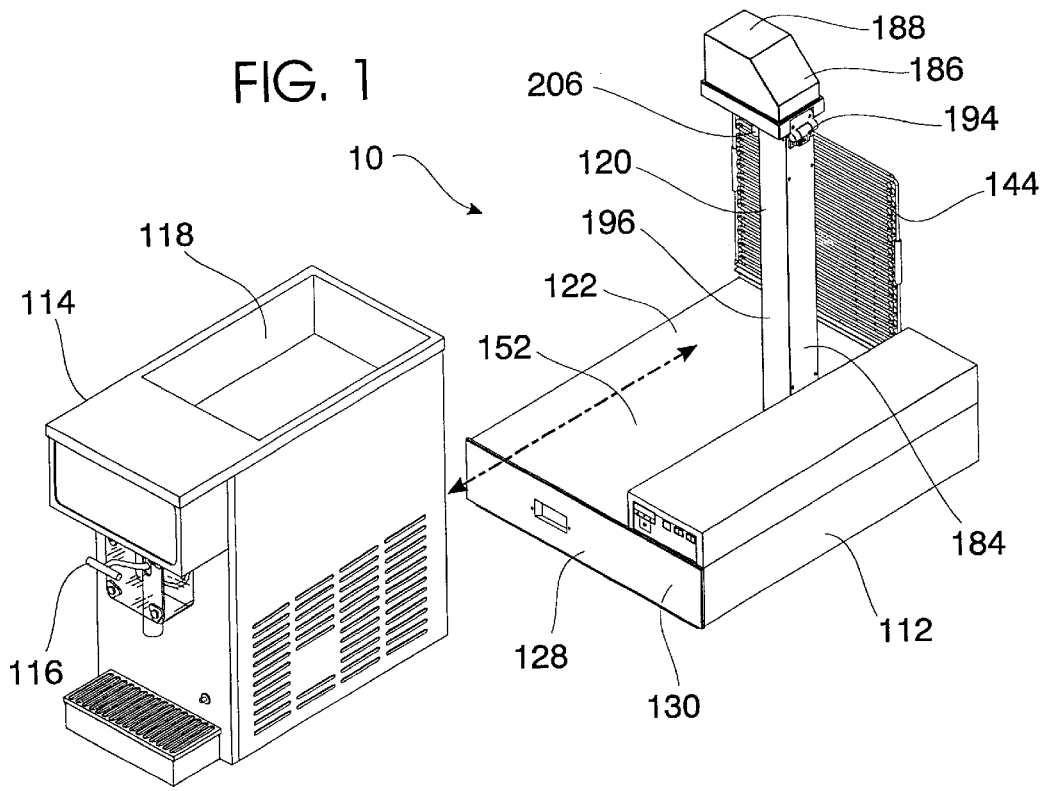
FIG. 1 is a perspective view of a preferred embodiment of a self-contained liquid storage, delivery and automatic fill apparatus constructed in accordance with the present invention and a semi-frozen liquid beverage dispenser exploded therefrom.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Like numbers in the drawings indicate like parts in various embodiments of the invention.

The present invention 10 provides a totally refrigerated environment for the bulk storage containers, provides for delivery of the liquid beverage from the bulk storage containers and provides for automatic filling of the beverage dispenser.

Figure 2:
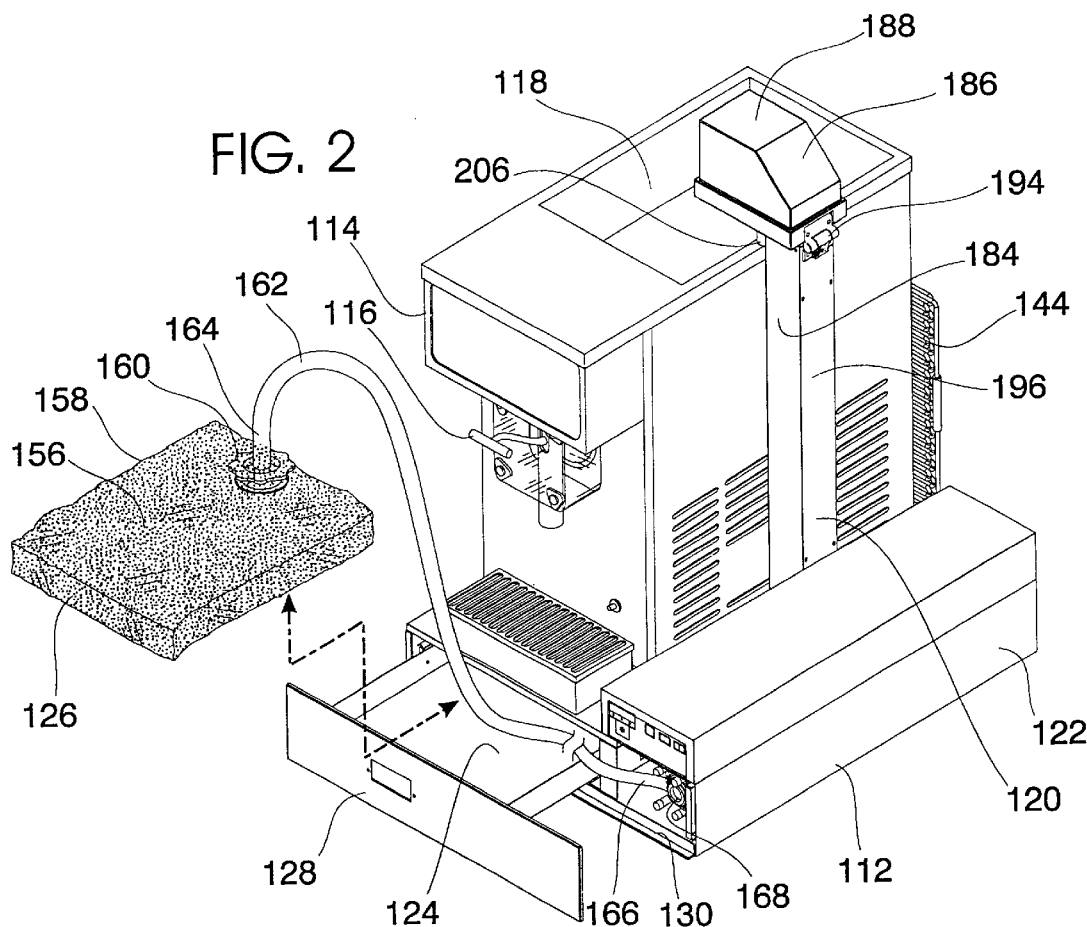
FIG. 2 is a perspective view of the apparatus in FIG. 1 with a storage drawer open and a bulk storage container in a loading position shown positioned with a semi-frozen liquid beverage dispenser.

Referring to the drawings in detail and FIGS. 1 and 2 in particular, a preferred embodiment of the invention 10 is provided. A retrofitable base unit 112 for use with chilled liquid beverage dispenser 114 is generally designed to dispense a beverage with a single dispense handle 116 and a single stainless steel hopper 118. A cover for the hopper has been removed for ease of viewing.

The base unit 112 is not significantly wider than the beverage dispenser and is not significantly taller than the beverage dispenser. The base unit 112 will rest on an existing shelf and will be located beneath dispenser 114 with fluid communication mechanism 120 to hopper 118. Accordingly, the invention does not have a large footprint and makes use of existing shelf space.

The unit 112 generally comprises a main housing 122 with at least one refrigerated storage cavity 124 for receiving bulk storage membrane container 126 which is discussed in greater detail below. In a preferred embodiment, main housing 122 includes drawer 128 accessible from front 130 of the housing 122 for locating bulk storage membrane container 126. In a preferred construction, housing 122 is made from durable material such as, but not limited to, stainless steel.

Figure 3:
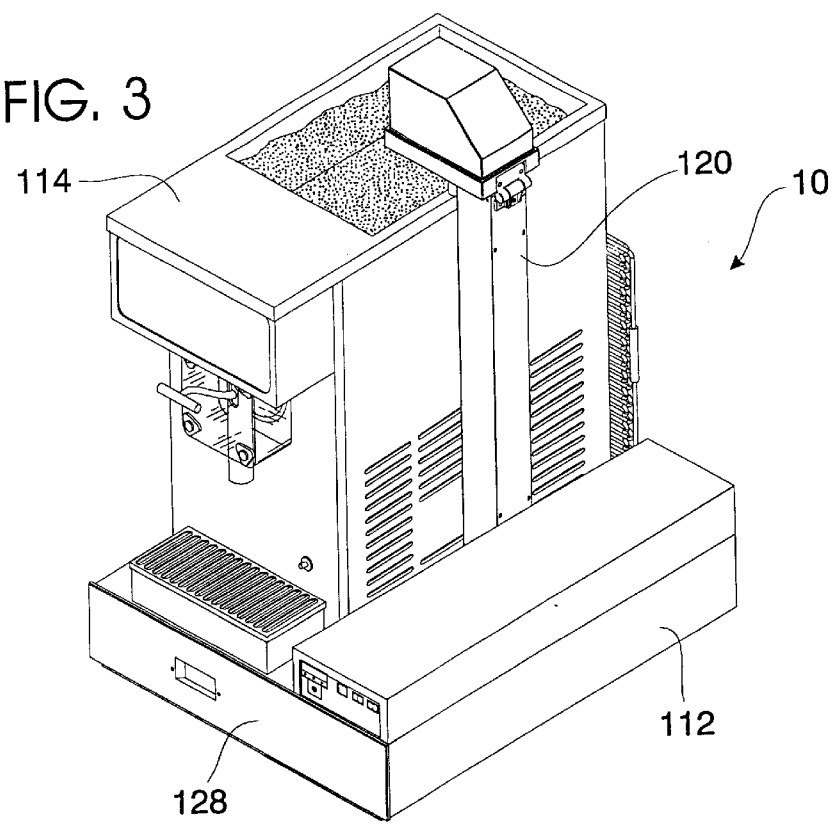
FIGS. 3 and 4 are perspective views of the invention shown in FIG. 1 in position with the beverage dispenser.
Figure 4:
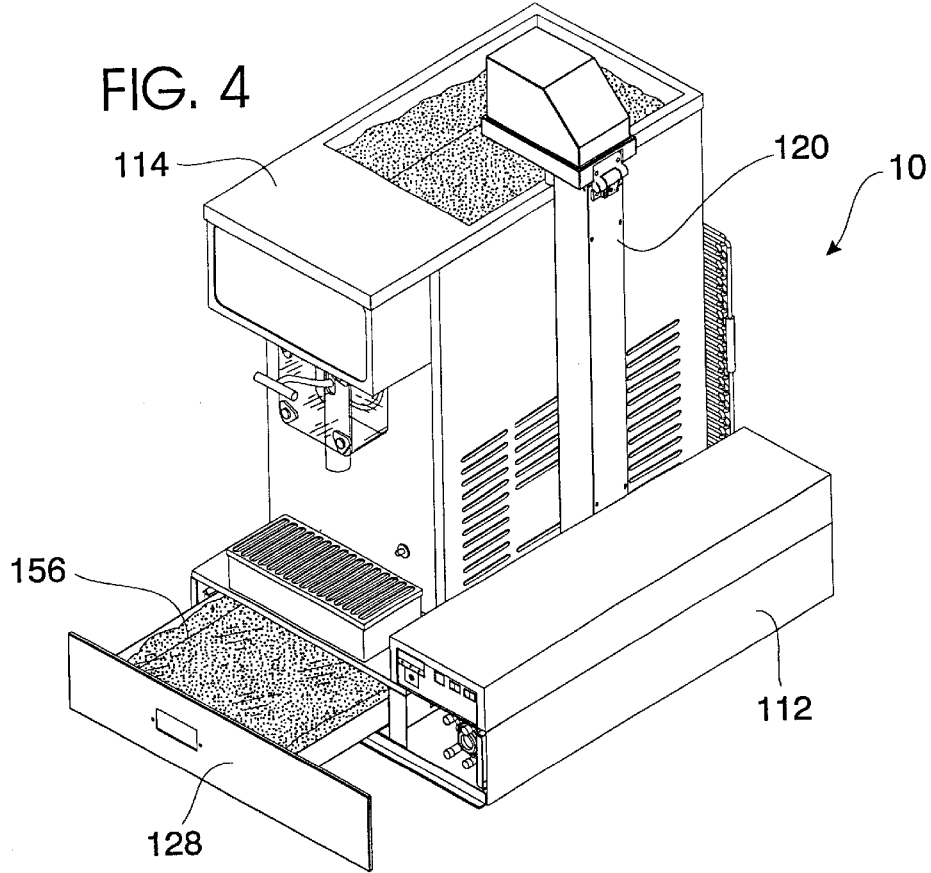

FIGS. 3 and 4 illustrates the invention installed with the dispenser 114 with the lid over the hopper removed.

Figure 5:
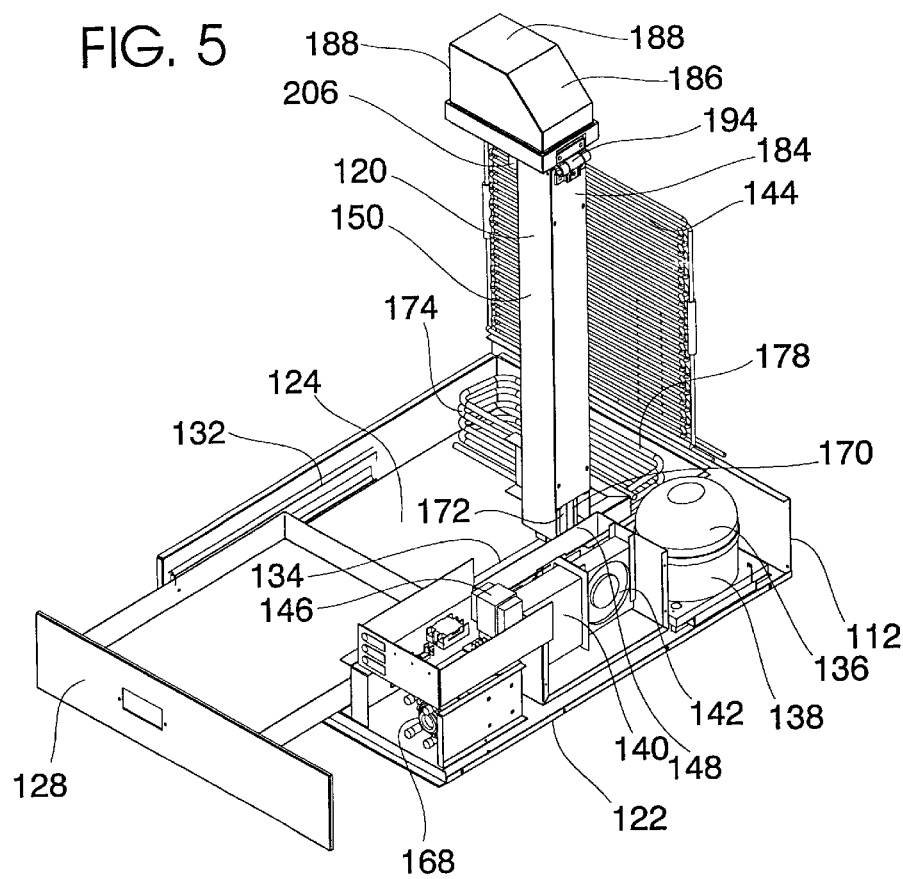
FIG. 5 is a perspective interior view of the apparatus in FIG. 1 with a drawer an open position.

Referring to the drawings and FIG. 5 in particular, the unit 112 is shown with portions removed for clarity. Drawer 128 is preferably on guide tracks 132 and 134 for easy access to cavity 124. Cavity 124 is thermally insulated. It is also contemplated that cavity 124 is thermally insulated in housing 122 from components which may produce heat, such as compressor 136 which will also be discussed in greater detail below.

Cavity 124 is refrigerated by known refrigeration system 138 such that cavity 124 is kept cool. The refrigeration system 138 will generally include, by way of example but not limited to, a compressor 136, an evaporator 140, a fan 142, condenser coils 144 and a thermostat 146.

Air plenum 148 is contemplated such that chilled air may pass from the cavity 124 into and through tower assembly 150 which will be discussed in greater detail below. In a preferred embodiment, compressor 136, evaporator 140, and fan 142, are generally located inside of the housing 122. Condenser coils 144 are preferably, but not necessarily, mounted in an upright fashion on top 152 of housing 122 such that they are generally hidden by dispenser 114 when dispenser 114 is installed with the base unit 112. The condenser coils will, likewise, not take up additional shelf space. Refrigeration system 138 may be electrically powered by AC electrical service common wall socket electrical outlets.

Returning to a consideration of FIG. 1 and FIG. 5, bulk storage container 126 comprises liquid product mix 156 stored in flexible membrane bag 158 constructed from but not limited to plastic with insertion point 160 for selectively attaching to product supply hose 162 first end 164. The flexible membrane bag 158 may initially be packaged and transported in a "bag'n box" as previously described. To install, the plastic membrane is removed from the bag'in box and attached to supply hose.

Product 156 supply hose 162 second end 166 generally attaches to and is in fluid communication with product mix 156 pump assembly 168 which selectively or automatically moves liquid product 156 to beverage dispenser hopper 118. Product mix 156 feed tube 170 first end (not seen in FIG. 2) communicates with product mix 156 pump assembly 168 and moves product mix 156 through feed tube 170 via fluid communication means 120 tower assembly 150, discussed in greater detail below. Product mix 156 pump assembly 168 may also be electrically powered by AC electrical service with common wall socket electrical outlets.

It is still further contemplated that a preferred embodiment of unit 112 includes a water supply 172 which includes water supply inlet (not shown), and water coils 174 which allow water to pass therethrough and be chilled in refrigerated cavity 124. Water meter 176 determines the amount of chilled water 178 to hopper 118 by transporting chilled water 178 through chilled water feed tube 180 first end 182 to fluid communication means 120 via tower assembly 150. It will be understood that in the event the product comes in a ready to use format, water will not be added. In that event, the water meter may be adjusted to stop the flow of water.

In a preferred embodiment of fluid communication, the tower assembly 150 generally provides chilled water 178 and refrigerated product mix 156 to hopper 118 of dispenser 114. The tower assembly 150 includes an upright housing 184 which preferably extends along side of dispenser 114, tower cap 186, and removable tower cap housing 188 for access to interior 190 of tower cap 186.

Tower cap 186 is generally positioned over hopper 118 such that nozzle 192 is in communication with hopper 118. Another preferred construction of tower cap 186 further provides hinge assembly 194 for positioning tower cap 186 over hopper 118. In a preferred embodiment, upright housing 184 and tower cap housing 188 are constructed from durable material such as but not limited to stainless steel. Upright housing 184 provides conduit 196 for product mix 156 feed tube 170, chilled water 178 feed tube 180, chilled air from air plenum 148 to pass into tower cap 186.

Figure 6:
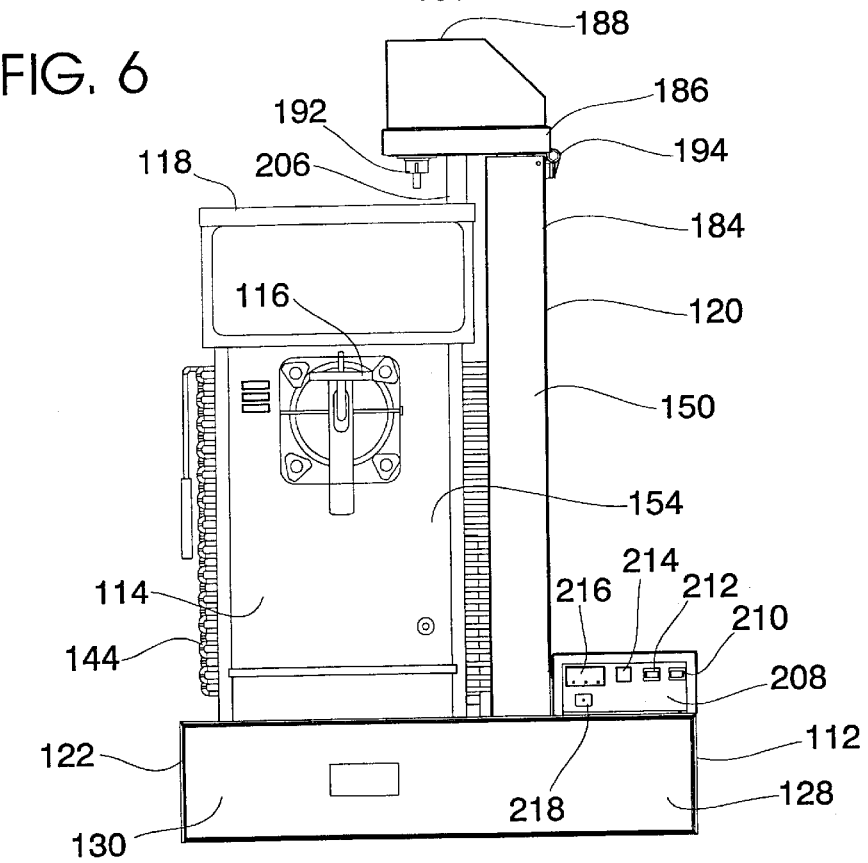
FIG. 6 is a front view of the apparatus of FIG. 1 positioned with a semi-frozen liquid beverage dispenser.
Figure 7:
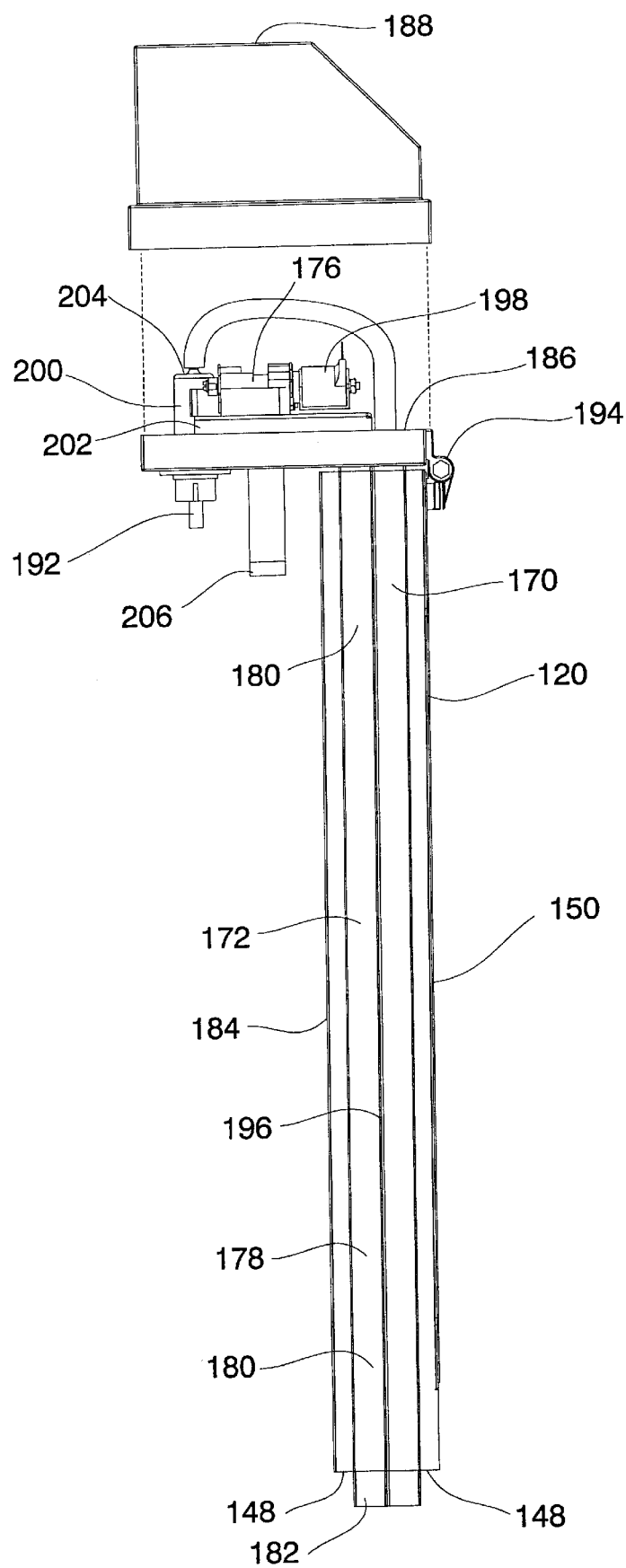
FIG. 7 is a partially exploded view of a tower assembly of the apparatus in FIG. 1 depicting a tower cap housing removed from a tower assembly.

Referring to the drawings and FIGS. 5 and 6 in particular, in a preferred embodiment tower cap 186 further generally includes chilled water 178 pump assembly 176, solenoid 198 for activation of water pump assembly 176, and mixing chamber 200.

Mixing chamber 200 is in communication with chilled water 178 via water tube 180 second end 202 and product mix 156 feed tube 170 second end 204. In operation, chilled water 178 and product mix 156 combine to a selective preset ratio in mixing chamber 200 where the resulting beverage is passed via nozzle 192 to dispenser 114 hopper 118. In a preferred embodiment, tower cap 186 further includes level probe 206 for determining the beverage level in hopper 118.

The chilled water 178 may also be used to flush the hopper and bowl during periodic cleaning of the beverage dispenser.

In summary, both liquid product and water are delivered through the tower to the hopper and bowl of the beverage dispenser.

A preferred embodiment of unit 112 includes an operational control panel interface 208 with main power activation switch 210 which selectively provides electricity to refrigeration means 138, product pump assembly 168, chilled water pump assembly 176, panel interface 208, and other electricity driven devices of unit 112. It is also contemplated that panel interface 208 further includes chilled water 178 pump assembly 176 and product mix 156 pump assembly 168 activation means 212 which may be automatically programmed to fill hopper 118 when bowl 118 is at a specific level of beverage and indicator 214 for visual or audible notification to user that bag 156 is empty.

It is contemplated that a sensor (not shown) may be provided on chilled water 178 pump assembly 176 and product mix 156 pump assembly 168 to sense when and how much respective chilled water 178 and product mix 156 has been delivered to hopper 118. Control panel interface 208 may further include refrigeration means 138 temperature control 216 such that cavity 124 is maintained at a desired temperature. It is also contemplated that locking mechanism 218 may be provided such that only an authorized user with a key could operate control panel interface 208.

Whereas, the present invention has been described in relation to the drawings attached hereto, it should be understood that other and further modifications, apart from those shown or suggested herein, may be made within the spirit and scope of this invention.

What is claimed is:

1. A self-contained liquid storage and delivery apparatus for a semi-frozen or chilled liquid beverage machine having a hopper to contain semi-frozen beverage therein, which apparatus comprises:

a housing having at least one refrigerated storage cavity in said housing for receiving a bulk storage container of liquid beverage and wherein said at least one refrigerated storage cavity of said housing further includes at least one drawer for receiving said bulk storage container of liquid beverage;

a planar surface on said housing, said planar surface adapted to support said beverage machine thereon; and a fluid conduit for passing said beverage from said bulk storage container to said beverage machine.

2. A self-contained storage and delivery apparatus as set forth in claim 1 wherein said bulk storage container is a flexible plastic membrane.

3. A self-contained storage and delivery apparatus as set forth in claim 1 further includes a water supply in fluid communication with said beverage machine having a tube passing through said at least one refrigerated storage cavity of said housing.

4. A self-contained storage and delivery apparatus as set forth in claim 2 wherein said fluid conduit attaches at one end to said flexible plastic membrane and at a second end to a pump assembly.

5. A self-contained storage and delivery apparatus as set forth in claim 1 which further includes a fluid level sensor for indicating the level of said semi-frozen liquid beverage in said hopper.

6. A self-contained liquid storage and delivery apparatus for a semi-frozen or chilled liquid beverage machine having a hopper to contain semi-frozen beverage therein, which apparatus comprises:

a housing having at least one refrigerated storage cavity in said housing for receiving a bulk storage container of liquid beverage;

a planar surface on said housing, said planar surface adapted to support said beverage machine thereon;

a fluid conduit for passing said beverage from said bulk storage container to said beverage machine; and a tower having a divided plenum which communicates with said refrigerated storage cavity.

7. A self-contained storage and delivery apparatus as set forth in claim 6 wherein a fan circulates air from said cavity through said plenum.

8. A self-contained storage and delivery apparatus as set forth in claim 6 wherein said at least one refrigerated storage cavity of said housing further includes at least one drawer for receiving said bulk storage container of liquid beverage.

9. A self-contained storage and delivery apparatus as set forth in claim 6 wherein said bulk storage container is a flexible plastic membrane.

10. A self-contained storage and delivery apparatus as set forth in claim 6 further includes a water supply in fluid communication with said beverage machine having a tube passing through said at least one refrigerated storage cavity of said housing.

11. A self-contained storage and delivery apparatus as set forth in claim 6 which further includes a fluid level sensor for indicating the level of said semi-frozen liquid beverage in said hopper.

12. A self-contained storage and delivery apparatus as set forth in claim 9 wherein said fluid conduit attaches at one end to said flexible plastic membrane and at a second end to a pump assembly.

\* \* \* \* \*